(12) United States Patent
Ike et al.

(10) Patent No.: US 6,301,915 B1
(45) Date of Patent: Oct. 16, 2001

(54) DEHUMIDIFICATION APPARATUS

(75) Inventors: Hidetoshi Ike; Yasushi Ishikawa; Kazunari Kakuta, all of Yokohama (JP)

(73) Assignee: Kankyo Co., Ltd., Kanagawa (JP)

( * ) Notice: Subject to any disclaimer, the term of this patent is extended or adjusted under 35 U.S.C. 154(b) by 0 days.

(21) Appl. No.: 09/577,568

(22) Filed: May 25, 2000

(30) Foreign Application Priority Data

May 25, 1999 (JP) .................................................. 11-145619

(51) Int. Cl.[7] .................................................. F25D 23/00
(52) U.S. Cl. .................................... 62/271; 62/93; 62/94; 62/186; 62/412; 62/49.3; 236/44 R; 236/44 A
(58) Field of Search .................................. 62/93, 94, 271, 62/186, 412; 236/49.3, 44 A, 44 R

(56) References Cited

U.S. PATENT DOCUMENTS

| | | | |
|---|---|---|---|
| 4,955,205 | * 9/1990 | Wilkinson | 62/94 |
| 4,982,575 | * 1/1991 | Besik | 62/271 |
| 5,251,458 | * 10/1993 | Tohernev | 62/271 |
| 5,325,676 | * 7/1994 | Meckler | 62/93 |
| 5,542,259 | * 8/1996 | Worek et al. | 62/94 |
| 5,632,954 | * 5/1997 | Coeliner et al. | 422/4 |
| 5,799,728 | * 9/1998 | Blume | 165/231 |
| 5,918,475 | * 7/1999 | Sakakibara et al. | 62/186 |
| 5,937,664 | * 8/1999 | Matsuno et al. | 62/259.2 |
| 5,996,365 | * 12/1999 | Tanaka | 62/196.4 |
| 6,209,622 | * 4/2001 | Lagace et al. | 165/8 |

* cited by examiner

Primary Examiner—William Doerrler
Assistant Examiner—Mark Shulman

(57) ABSTRACT

A dehumidification apparatus of the type using a deliquescent agent, with which the leakage of deliquesced liquid out of the apparatus is securely prevented is disclosed. In the dehumidification apparatus, an air inlet and an air outlet are formed in the upper plate of the container. At least one closing member which can close the air inlet and the air outlet is arranged above the air inlet and the air outlet. At least one movable member is provided, which has each distal end, which member can move in the vertical direction, which member is attached to the closing member, and which member is urged downwardly such that when the dehumidification apparatus is not placed with its bottom down, the distal end of the movable member protrudes from the bottom of the apparatus so that the closing member closes the air inlet and the air outlet, and when the dehumidification apparatus is placed on a plane with its bottom down, the distal end of the movable member is made flush with the bottom overcoming the downward urging force by virtue of weight of the apparatus so that the air inlet and the air outlet are open.

20 Claims, 12 Drawing Sheets

DEHUMIDIFICATION APPARATUS

BACKGROUND OF THE INVENTION

I. Field of the Invention

The present invention relates to a dehumidification apparatus.

II. Description of the Related Art

Various dehumidification apparatuses utilizing deliquescent dehumidification agents such as calcium chloride are known. As a typical example of this type of known dehumidification apparatuses, the dehumidification apparatus described in Japanese Laid-open Patent Application (Kokai) No. 10-192641 will now be described referring to FIG. 12.

The known dehumidification apparatus 100 shown in FIG. 12 comprises a container 101 and a cover 102 enclosing an electric fan 115. On the bottom 101a of the container, granular deliquescent dehumidification agent D such as calcium chloride which absorbs moisture in the air is laid.

The container 101 is closed except for an opening 104 formed in the upper portion of the container 101. A cap 106 having a vertically extending cylindrical air-introducing duct 105 is mounted on the container 101 such that the cap 106 covers the opening 104.

The cover 102 comprises a cylindrical air-discharging duct 110 which vertically extends and coaxially nested in the air-introducing duct 105. The distal end of the air-discharging duct 110 protrudes from the distal end of the air-introducing duct 105. The cover 102 includes a lower cover 113 having an air inlet 112 which communicates with an air-introducing passage 111 formed between the outer surface of the air-discharging duct 110 and the inner surface of the air-introducing duct 105. The cover 102 has an upper cover 116 having an air outlet 114 which communicates with the inner side of the container 101 through the air-discharging duct 110. The upper cover 116 harbors the electric fan 115 and a battery 117 which gives the power to drive the fan 115.

In operation, the fan 115 is driven. As a result, air is drawn through the air inlet 112 and the air-introducing passage 111 into the inside of the container 101. The air is then discharged from the apparatus from the air outlet 114 through the air-discharging duct 110. Since the air contacts the deliquescent dehumidification agent D on the bottom of the container, the moisture contained in the air is absorbed by the deliquescent dehumidification agent D and the air is dried. On the other hand, the absorbed moisture is converted to deliquesced liquid and accumulated on the bottom 101a of the container 101.

Japanese Laid-open Patent Application (Kokai) No. 2-227115 proposes to separate the deliquescent dehumidification agent D and the deliquesced liquid by harboring the deliquescent dehumidification agent D on a porous plate arranged on the upper portion of the container 101 so that the deliquesced liquid drops onto the bottom 101a of the container through the pores formed in the porous plate. Since the deliquescent dehumidification agent D is separated from the deliquesced liquid and so can be kept relatively dry, the ability to absorb moisture is kept high.

In both of the above-described known dehumidification apparatuses, as shown in FIG. 12, the distal ends of the air-introducing duct 105 and the air-discharging duct 110 open above the deliquesced liquid accumulated on the bottom 101a of the container 101. Therefore, if the dehumidification apparatus is tumbled or reversed, the deliquesced liquid and the granular deliquescent agent may leak from the apparatus through the air-discharging duct 110 and through the air outlet 114, or through the air-introducing passage 101 and through the air inlet 112.

Further, to minimize the possibility of the leakage of the deliquesced liquid from the apparatus, the ends of the distal ends of the air-introducing duct 105 and the air-discharging duct 110 open at a location near the three-dimensional center of the container 101. Therefore, the deliquesced liquid cannot be accumulated to a level higher than the distal ends of the air-introducing duct 105 and the air-discharging duct 110, that is, about the half point of the height of the container. In other words, the container must have an inner volume more than twice of the upper limit of the volume of the deliquesced liquid to be accumulated, which is problematic for attaining compaction of the apparatus.

SUMMARY OF THE INVENTION

Accordingly, an object of the present invention is to provide a dehumidification apparatus with which it is secured that the deliquesced liquid does not leak from the apparatus even if the apparatus is tumbled or reversed.

Another object of the present invention is to provide a dehumidification apparatus with which the deliquesced liquid can be accumulated to a higher level in the vessel than with the known dehumidification apparatuses.

That is, the present invention provides a dehumidification apparatus comprising: a container containing a deliquescent dehumidification agent, which container has at least one air inlet and at least one air outlet, and has an upper plate covering the container; at least one closing member which can close the air inlet and the air outlet; at least one movable member having each distal end, which member can move in the vertical direction, which member is attached to the closing member, and which member is urged downwardly such that when the dehumidification apparatus is not placed with its bottom down, the distal end of the movable member protrudes from the bottom of the apparatus so that the closing member closes the air inlet and the air outlet, and when the dehumidification apparatus is placed on a plane with its bottom down, the distal end of the movable member is made flush with the bottom overcoming the downward urging force by virtue of weight of the apparatus so that the air inlet and the air outlet are open; and a fan driven by a motor, which introduces air into the container from the air inlet and discharges air from the container through the air outlet so that the air passes through the container.

With the dehumidification apparatus according to the present invention, when the apparatus is tumbled or reversed, the air inlet and the air outlet are immediately closed by the closing member, so that leakage of the deliquesced liquid to the outside of the apparatus is prevented. Further, by providing the air inlet and the air outlet in the upper plate of the container, the deliquesced liquid can be accumulated to a level higher than the half point of the height of the container, the apparatus can be more compacted than the known dehumidification apparatuses described above.

DETAILED DESCRIPTION OF THE PREFERRED EMBODIMENTS

Figure 1:
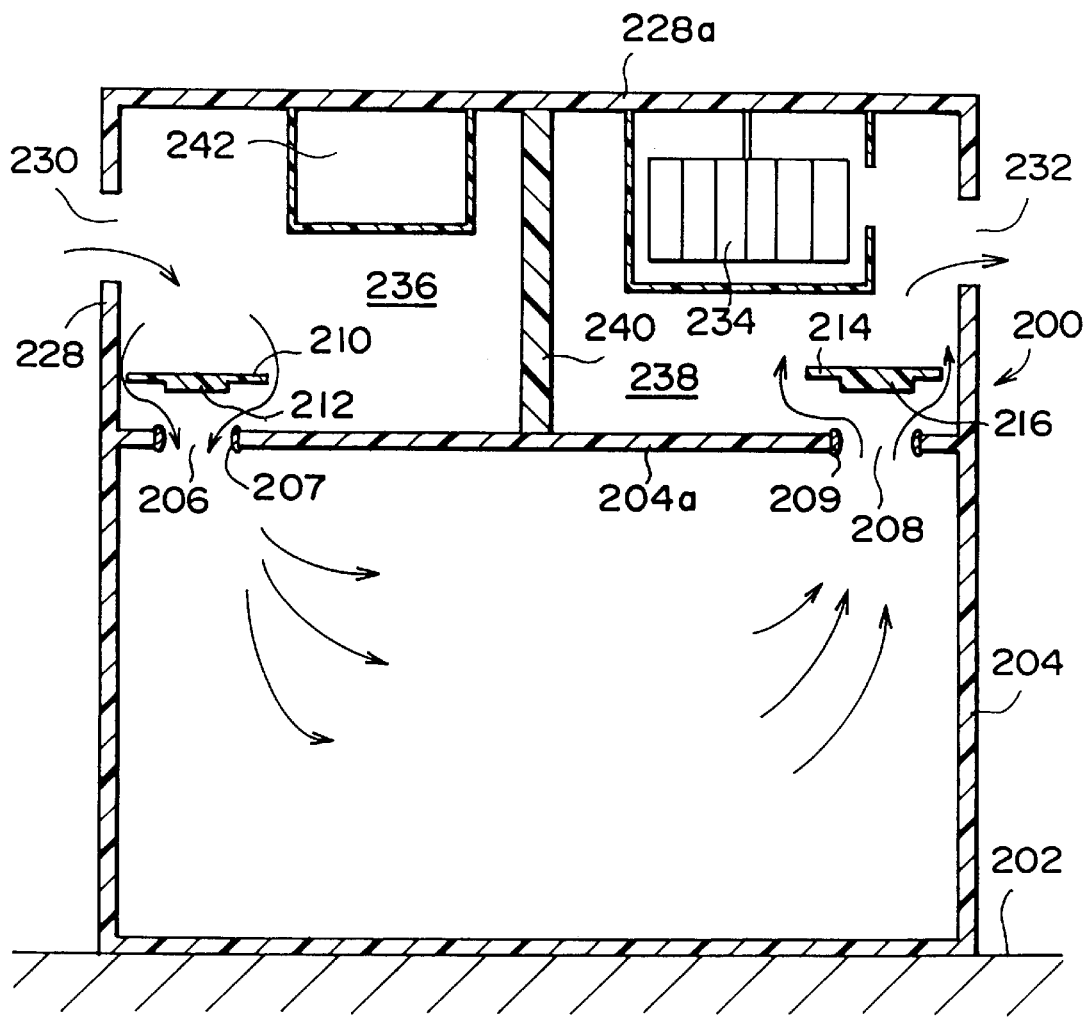
FIG. 1 is a schematic cross sectional end face front view cut along the 1-1' line shown in FIG. 2, of a preferred embodiment of the dehumidification apparatus according to the present invention when the apparatus is placed on a plane with its bottom down.
Figure 2:
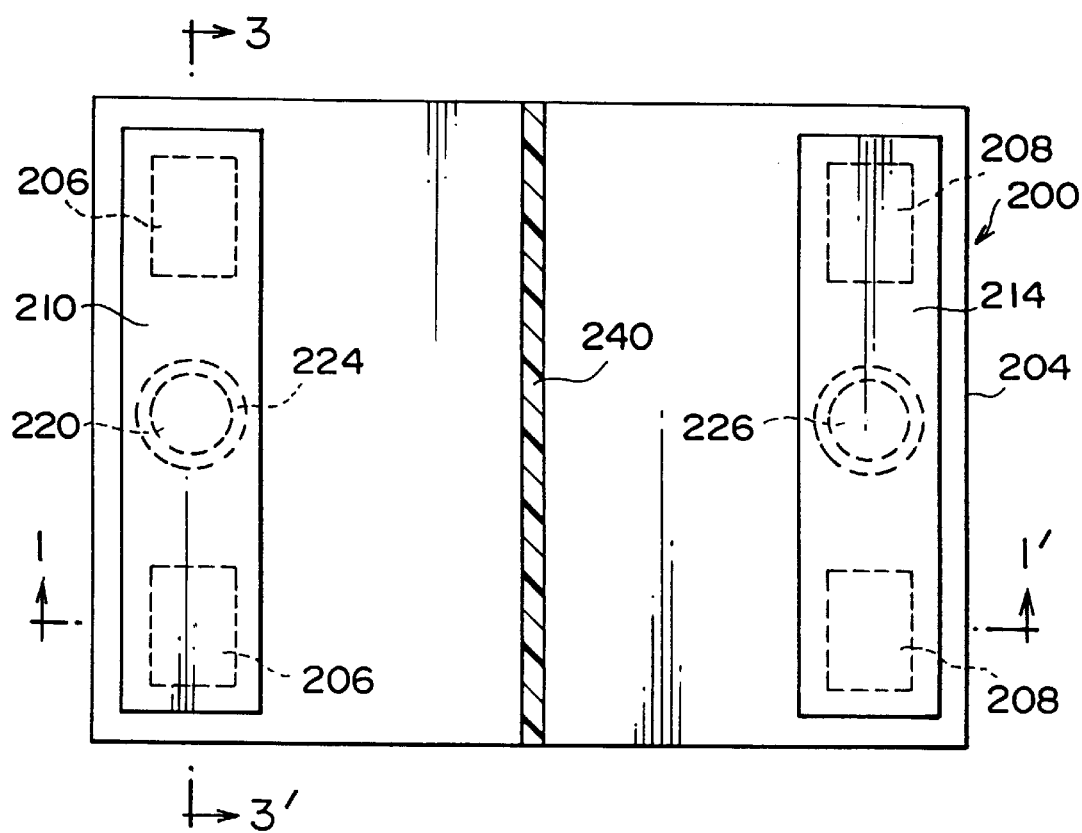
FIG. 2 is a schematic plan view thereof, the upper plate of the vessel on the container being removed for clarity.
Figure 3:
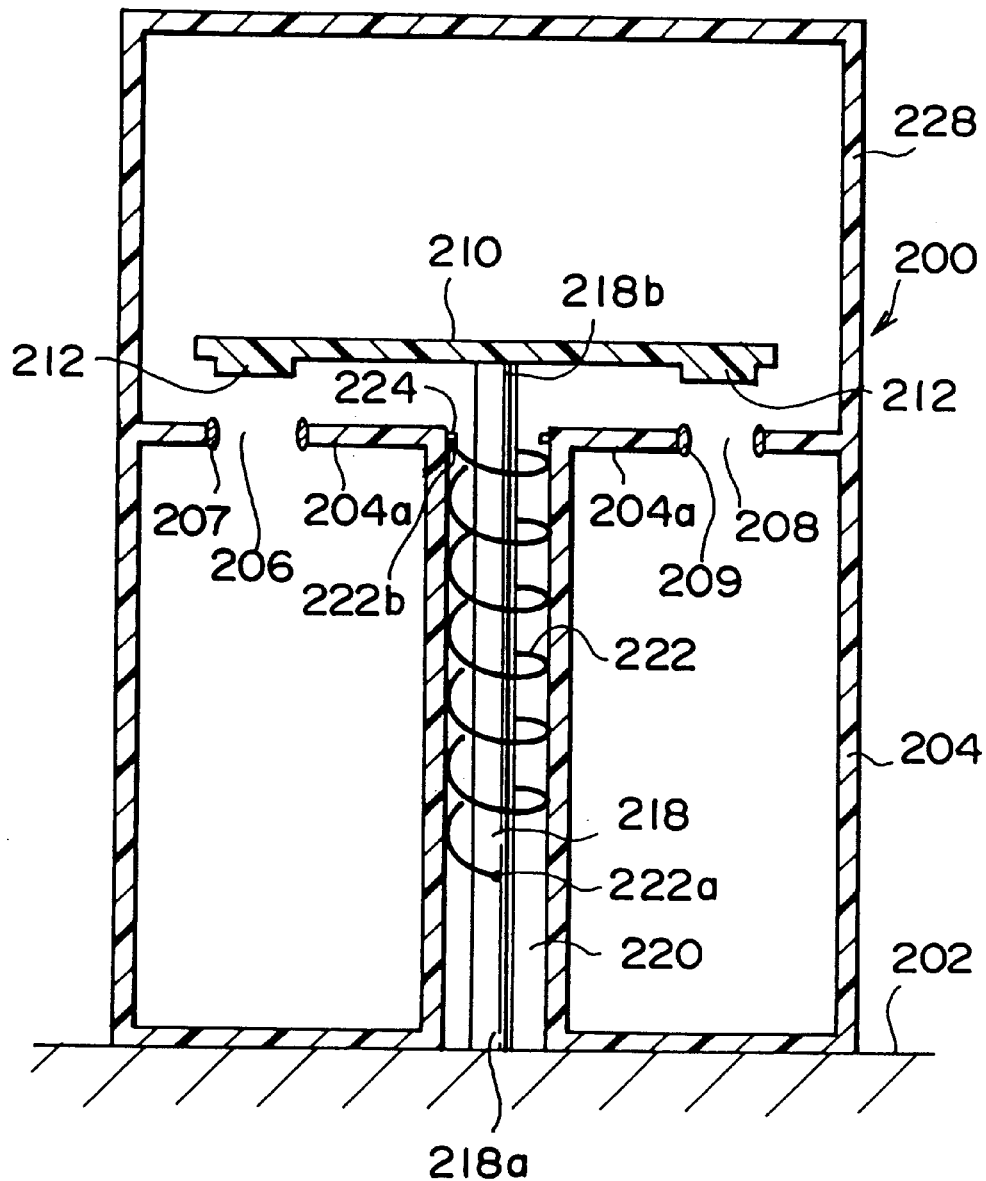
FIG. 3 is a schematic cross sectional end face side view thereof cut along the 3-3' line shown in FIG. 2.
Figure 4:
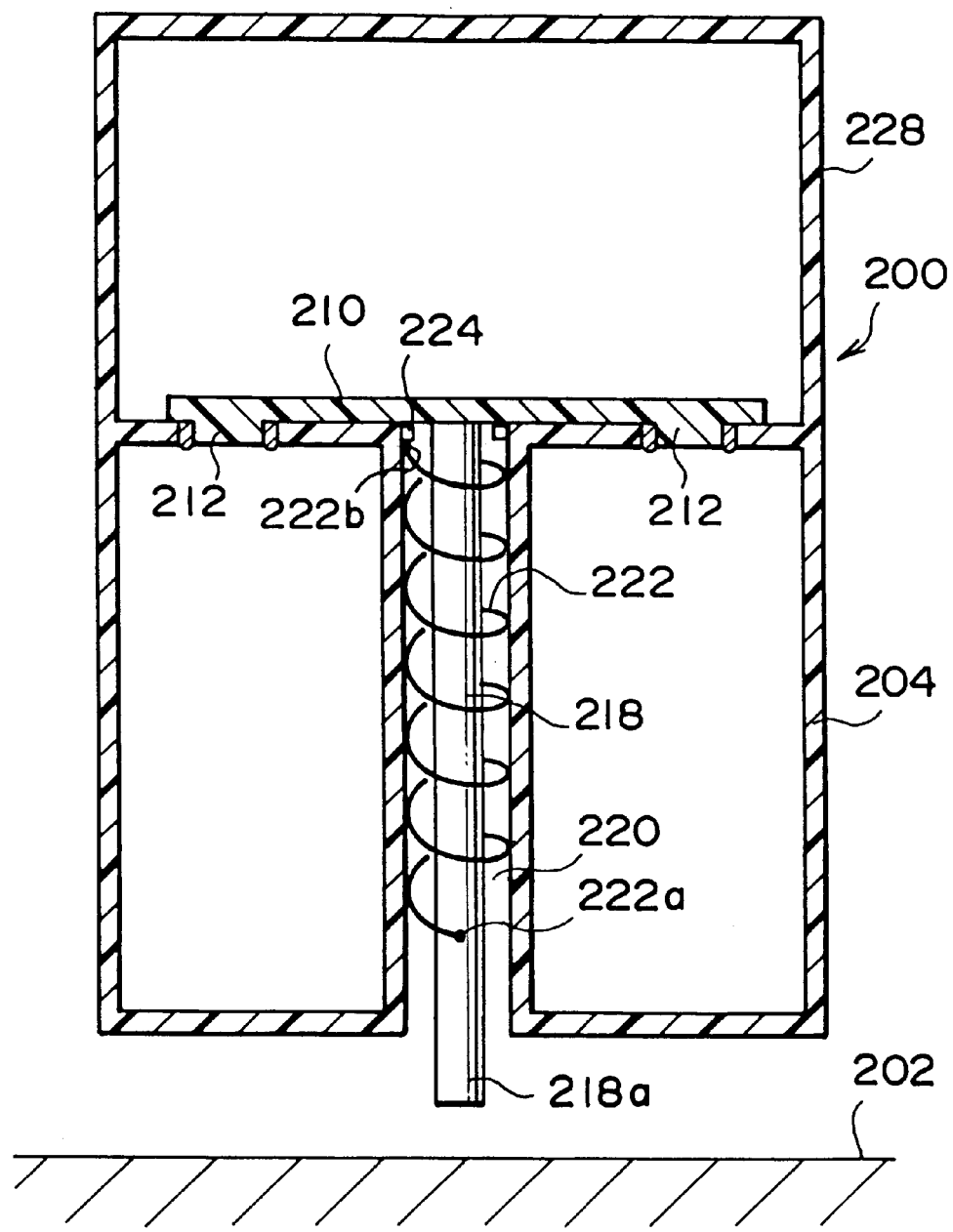
FIG. 4 is a schematic cross sectional end face side view cut along the 3-3' line shown in FIG. 2, of the apparatus shown in FIGS. 11 to 3, in the state that the apparatus is lifted up.

A preferred embodiment of the dehumidification apparatus according to the present invention will now be described referring to FIGS. 1 to 4. FIG. 1 is a schematic cross sectional end face front view cut along the 1-1' line shown in FIG. 2, of a preferred embodiment of the dehumidification apparatus according to the present invention when the apparatus is placed on a plane with its bottom down; FIG. 2 is a schematic plan view thereof, the upper plate of the vessel on the container being removed for clarity; FIG. 3 is a schematic cross sectional end face side view thereof cut along the 3-3' line shown in FIG. 2; and FIG. 4 is a schematic cross sectional end face side view cut along the 3-3' line shown in FIG. 2, of the apparatus shown in FIGS. 1 to 3, in the state that the apparatus is lifted up.

Referring to FIGS. 1 to 3, a dehumidification apparatus 200 according to a preferred embodiment of the present invention is placed on a plane 202 such as table, desk, floor or the like. The dehumidification apparatus comprises a container 204 containing a deliquescent dehumidification agent (not shown). The deliquescent dehumidification agent may preferably be granular calcium chloride as in the conventional apparatuses. The container 204 has an upper plate 204a covering the same. The upper plate 204a may be formed integrally with the other portion of the container 204, or a separate plate may be attached to the upper end of the container so as to cover the container. The container has at least one air inlet 206 and at least one air outlet 208. In the embodiment shown in FIGS. 1–4, the container 204 has two air inlets 206 and two air outlets 208 (see FIG. 2). Needless to say, the numbers of the air inlets 206 and the air outlets 208 are not restricted. It is preferred to form the air inlets 206 and the air outlets 208 in the upper plate 204a of the container 204 because the deliquesced liquid may be stored in the container to a higher level. Further, the air inlets 206 and the air outlets 208 are preferred to be located as far as possible as shown in FIG. 1 so as to effectively use the entire inner space of the container 204. The container 204 is closed except for the air inlets 206 and the air outlets 208. The container 204 may have a relatively large through hole (not shown) in one side thereof for discarding the deliquesced liquid and for replacing the deliquescent dehumidification agent, which through hole is always closed with a cap (not shown) in operation. A packing 207 made of an elastic material such as rubber is mounted on the periphery of each air inlet 206, and a packing 209 is mounted on the periphery of each air outlet 208. These packings 207, 209 are effective for attaining water-tightness when the air inlets 206 and the air outlets 208 are closed as hereinbelow described. The apparatus comprises a first closing member 210 for closing the air inlets 206 and a second closing member 214 for closing the air outlets 208. As shown in FIG. 2, each of the first and second closing members may preferably be in the form of a plate. The first closing member 210 has protrusions 212 corresponding to the air inlets 206, and the second closing member 214 has protrusions 216 corresponding to the air outlets 208. As will be described later in detail, the protrusions 212 are inserted into the air inlets 206 and the protrusions 216 are inserted into the air outlets 208 when the apparatus 200 is lifted, tumbled or reversed. Although these protrusions 212 and 216 are not necessary, formation of these protrusions are preferred for easily securing that the air inlets 206 and air outlets 208 are closed water-tightly. It should be noted that the air inlets 206 and the air outlets 208 may be closed with a single closing member as in another embodiment which will be described in detail below. As shown in FIG. 3, to the first closing member 210, a first movable member 218 is attached. The movable member 218 may be either integrally formed with the first closing member 210 or a separate movable member 218 may be connected to the first closing member 210. The movable member 218 may preferably be a vertically extending rod having a distal end 218a and a proximal end 218b as shown in FIG. 3. The proximal end 218b is connected to the first closing member 210. The movable member 218 is inserted in a vertically extending first through hole 220 formed in the container 204 (see FIGS. 2 and 3). The first movable member 218 is downwardly urged. In the present embodiment, the downward urging force is provided by a spring 222. As shown in FIG. 3, the first movable member 218 may be inserted in the spring 222. The proximal end 222b of the spring 222 is fixed to a supporting member 224 formed on at least a portion of the periphery of the first through hole 220, and the distal end 222a of the spring 222 is attached to the movable member 218. When the apparatus 200 is placed on the plane 202, the spring 222 is in a compressed state so that the spring 222 downwardly urges the movable member 218. The downward urging force provided by the spring 222 is selected such that the downward urging force is smaller than the weight of the apparatus 200. Therefore, as shown in FIG. 3, when the apparatus is correctly placed on the plane 202, that is, placed with its bottom down, the distal end 218a of the first movable member 218 is made flush with the bottom of the container 204. As for the second closing member 214, in the same manner as the first closing member 210, a second movable member (not shown) which is a vertically extending through a second through hole 226 (see FIG. 2) is attached to the second closing member 214 and the second movable member (not shown) is downwardly urged by a spring (not shown).

In this preferred embodiment, on the upper plate 204a of the container 204, a vessel 228 having an upper plate 228a is formed. The upper plate 228a may be a separable cover. The vessel 228 communicates with the inner side of the container 204 through the air inlets 206 and the air outlets 208. The vessel 228 has at least one air-introduction hole 230 and at least one air-discharging hole 232. The vessel 228 harbors a fan 234 such as sirocco fan which is driven by a motor (not shown) and which generates air flow through the inner space of the container 204 as will be described later in detail. The inner space of the vessel 228 may preferably be separated into a first chamber 236 and a second chamber 238 by a partition 240, wherein the first chamber 236 has the air-introduction hole 230 and in which the air inlets 206 are open, and the second chamber 238 has the air-discharging hole 232 and in which said air outlets are open. Such separation of the vessel 228 is preferred because the dehumidified air to be discharged from the air-discharging hole 232 is not mixed with the air before being dehumidified. The number of the partition 240 is not restricted to one. If the number of the partition 240 is two, the vessel 228 is separated into three chambers, and a battery for providing power to the motor driving the fan 234 may be harbored in the middle chamber. The vessel 228 harbors a humidity sensor 242 electrically connected to the motor driving the fan 234. By virtue of this humidity sensor 242, the fan 234 may be operated only when the ambient humidity is higher than the desired prescribed value. In a preferred embodiment, the upper plate 228a of the vessel 228 is a separable cover and the fan 234 and the humidity sensor 242 are hung on the cover. With this arrangement, assembly of the apparatus is easy and the maintenance of the apparatus such as cleaning and repairing of the fan 234, motor and/or the humidity sensor 242 is also easy.

In operation, the dehumidification apparatus 200 is placed on the plane 202 such as table, desk, floor, shelf or the like. In this condition, as mentioned above, the distal end 218a of the first movable member 218 as well as the distal end of the second movable member (not shown) is made flush with the bottom of the container 204 overcoming the downward urging force generated by the spring 222 and by the spring (not shown) surrounding the second movable member (not shown) by virtue of the weight of the apparatus 200 as shown in FIG. 3. Thus, in this state, the air inlets 206 and the air outlets 208 are open.

In this state, the fan 234 is rotated by the motor (not shown) to make air flow. The air flow is schematically indicated in FIG. 1 by arrows. That is, air is drawn from the air-introduction hole 230 into the first chamber 236 in the vessel 228 and then drawn into the inner side of the container 204 through the air inlets 206. After passing through the inner space of the container 204, the air is discharged from the container 204 through the air outlets 208 and then discharged from the second chamber 238 in the vessel 228 to the outside of the apparatus through the air-discharging hole 232. During the air passes through the container 204, the air contacts the deliquescent dehumidification agent contained therein and dried thereby. Therefore, dried air is discharged from the apparatus 200. The moisture removed from the air passing through the container 204 is accumulated in the container 204 as deliquesced liquid.

When the apparatus 200 is not correctly placed on the plane 202 with its bottom down, that is, when the apparatus 200 is lifted up, tumbled, reversed, or is made to be in any position in which the apparatus 200 is not placed on the plane 202 with its bottom down, as shown in FIG. 4, the first movable member 218 is downwardly moved such that its distal end 218a protrudes from the bottom of the container 204 by the downward urging force of the spring 222. This is because that the weight of the apparatus 200 is no longer exerted to the spring 222, so that the spring 222 can extend from the compressed state. By extension of the spring 222, the first movable member 218 is downwardly moved because one end 222a of the spring 222 is attached to the first movable member 218 and the another end 222b of the spring 222 is attached to the stationary supporting member 224. As a result, the first closing member 210 attached to the first moving member 218 also downwardly moves to close the air inlets 206. In the shown preferred embodiment, the protrusions 212 formed on the first closing member 210 are inserted into the air inlets 206, respectively, so as to watertightly close the air inlets 206. In exactly the same manner, the air outlets 208 are also closed with the second closing member 214 such that the protrusions 216 are inserted into the air outlets 208, respectively.

Thus, when the apparatus 200 is not correctly placed on the plane 202, that is, when the apparatus 200 is lifted up, tumbled, reversed, or is made to be in any position in which the apparatus 200 is not placed on the plane 202 with its bottom down, the air inlets 206 and the air outlets 208 are immediately closed with the first and the second closing members 210, 214, respectively. Therefore, leakage of the deliquescent dehumidification element (not shown) or the deliquesced liquid contained in the container 204 out of the apparatus 200 through the air inlets 206 and/or air outlets 208 are securely prevented.

Figure 5:
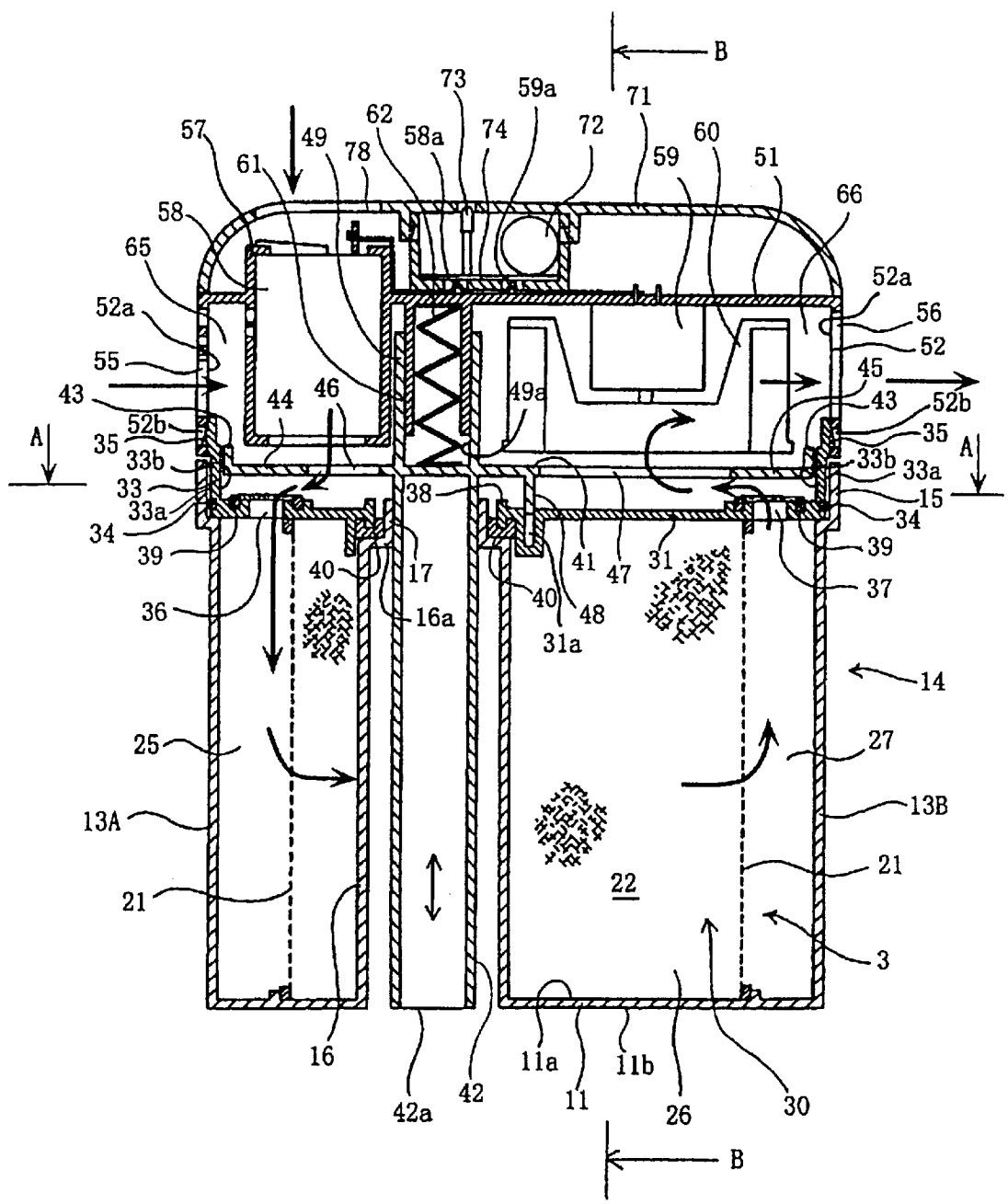
FIG. 5 is a schematic cross sectional front view of the second preferred embodiment according to the present invention.
Figure 6:
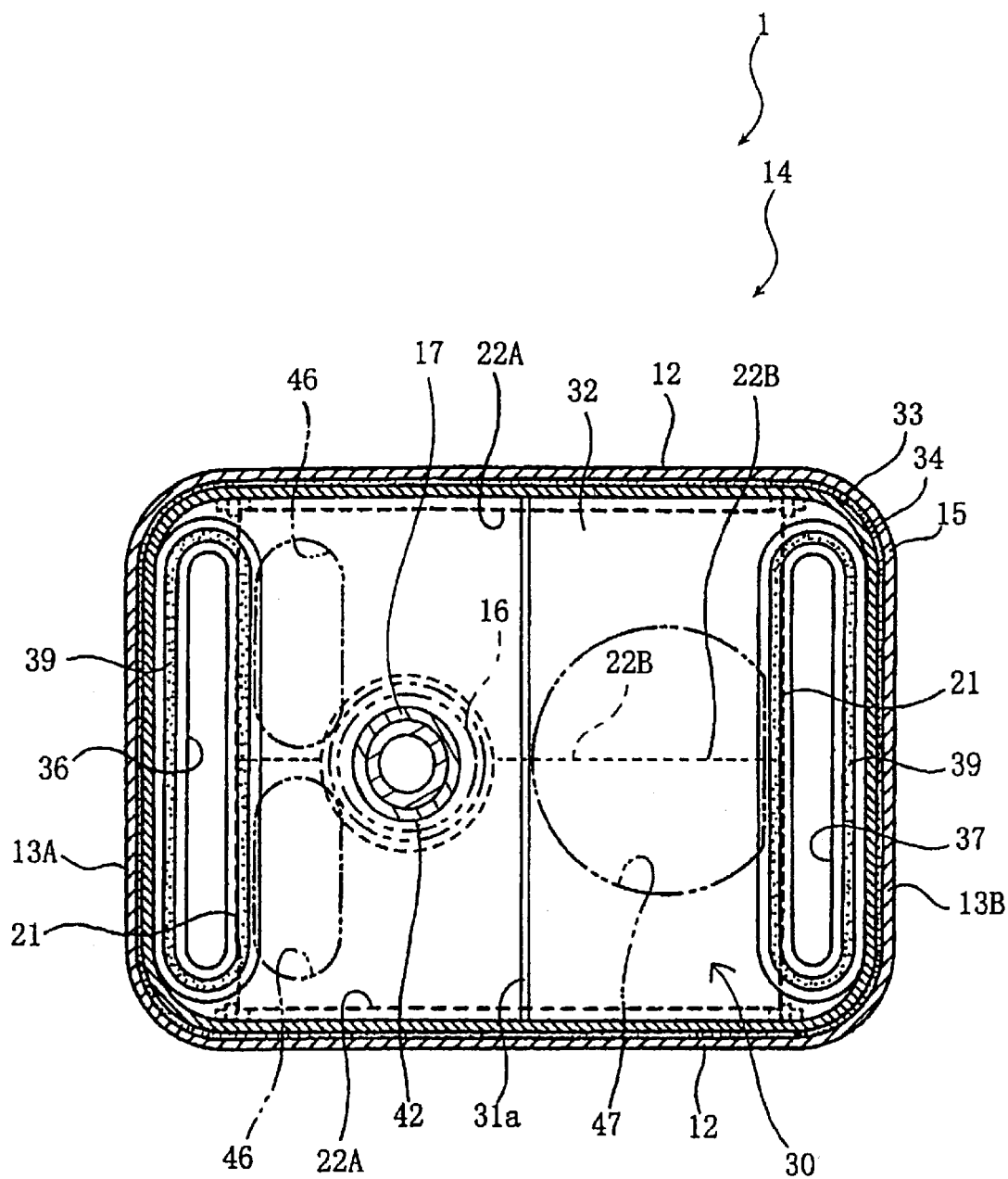
FIG. 6 is a schematic cross sectional plan view cut along the A—A line shown in FIG. 5.
Figure 7:
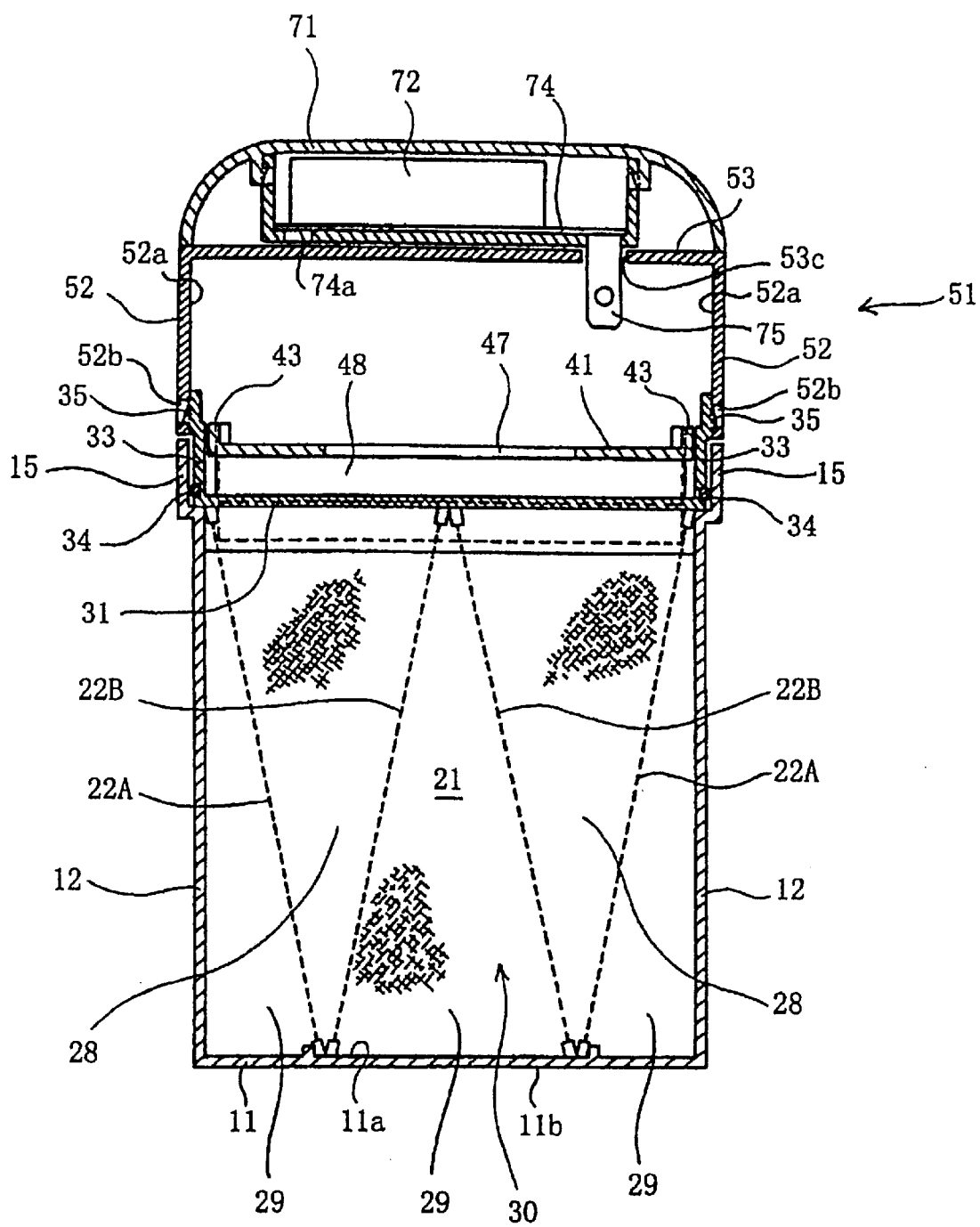
FIG. 7 is a schematic cross sectional side view cut along the B—B line shown in FIG. 5.

A second preferred embodiment of the present invention will now be described referring to FIGS. 5–9. FIG. 5 is a schematic cross sectional front view of the second preferred embodiment according to the present invention; FIG. 6 is a schematic cross sectional plan view cut along the A—A line shown in FIG. 5; and FIG. 7 is a schematic cross sectional side view cut along the B—B line shown in FIG. 5.

A dehumidification apparatus 1 comprises a container 2 in which a deliquescent dehumidification agent is contained and an outer cover 51 mounted on the container 2.

The container 2 has a substantially rectangular bottom 11 and a body portion 14 comprised of longer walls 12 and shorter walls 13, which walls extend from the periphery of the bottom 11. A fitting portion 15 is formed on the upper end of the body portion 14. The fitting portion 15 comprises an outwardly extending section which extends toward the outside of the container and a section having a prescribed height which extends upright from the periphery of the outwardly extending section.

In the vicinity of the center of the container 2, a cylindrical guide pipe 16 extending from the bottom 11 to the upper end of the body portion 14 is provided. The lower end of the guide pipe 16 opens in the lower surface 11b of the bottom at a prescribed diameter. The upper end of the guide pipe 16 is provided with a cylindrical portion 17 having a decreased diameter formed via a step portion 16a.

The container 2 contains a holder 3 which separates the inner space 30 of the container 2 into a plurality of compartments, and which can hold the granular dehumidification agent (not shown). The holder 3 is composed of nets (porous plates) made of a synthetic resin, whose mesh size is smaller than the granule size of the dehumidification agent. The holder 3 comprises two vertical plates 21 facing the shorter walls 13, and four slant plates 22 facing the longer walls 12.

As shown in FIGS. 5 and 6, the vertical plates 21 are parallel to the shorter walls 13 and span the longer walls 12. The vertical plates 21 stand up from the upper surface 11a of the bottom of the container 2 and vertically extends up to the upper end of the body portion 14 of the container 2.

The slant plates 22 are arranged between the vertical plates 21 such that the slant plates 22 form W-shaped configuration. More particularly, the slant plates 22 includes outer slant plates 22A. The upper end of each outer slant plate 22A is coincide with the upper end of the respective longer wall 12, and the lower end of each outer slant plate 22A is on the upper surface 11a of the bottom of the container. Each outer slant plate 22A is arranged such that the lower the position in the outer slant plate 22A, the farther from the respective longer wall 12. The slant plate 22 also includes inner slant plates 22B each of whose upper end is attached to the center between the longer walls 12 and each of whose lower end is on the upper surface 11a of the bottom of the container 2. Each inner slant plate 22B is arranged such that the lower the position in the lower slant plate 22B, the closer to the respective longer wall 12.

In the inner space 30, the holder 3 forms an air-introducing chamber 25 between one of the vertical plates 21 and a shorter wall 13A and an air-discharging chamber 27 between the other vertical plate 21 and the other shorter wall 13B.

The holder 3 gives, between the vertical plates 21, dehumidification agent-holding chambers 28 in which the dehumidification agent is held and air passage chambers 29 through which air passes. As shown in FIG. 7, each dehumidification agent-holding chamber 28 is in the form of a wedge projecting downwardly, which chamber 28 is delimited by the outer slant plate 22A and the inner slant plate 22B. Each of the air passage chambers 29 is in the form of mountain projecting upwardly, which chamber 29 is delimited by the both inner slant plates 22B or by the outer inner slant plate 22A and the vertical plate 21.

The dehumidification agent held in the dehumidification agent-holding chamber 28 is granular calcium chloride or the like which deliquesces by absorbing moisture in the air. The dehumidification agent is supplied from the upper side to the dehumidification agent-holding chamber 28 and retained in the form of a wedge projecting downwardly.

That is, the dehumidification agent is retained such that it faces the air passage chamber 29 at the outer slant plates 22A and inner slant plates 22B, and faces the air-introducing chamber 25 and the air-discharging chamber 27 at the vertical plates 21. As shown in FIG. 6, in the inner slant plates 22B of the holder 3, an opening for penetrating the guide pipe 16 is formed.

An intermediate cover 31 (upper plate) is fitted to the upper end of the container 2, so that the inner space 30 is delimited by the container 2 and the intermediate cover 31. The intermediate cover 31 has a planar portion 32 which closes the upper opening of the container 2 and a peripheral wall 33 which stands up from the periphery of the planar portion 32, and which is taller than the fitting portion 15.

A packing 34 is mounted on the outer surface 33a of the peripheral wall 33, which packing 34 is for sealing the fitting portion 15 and the peripheral wall 33 in the fitted state. On the upper end of the peripheral wall 33, a fitting portion 35 for fitting to the outer cover 51 is formed.

In the planar portion 32, an air inlet 36 is formed on the air-introducing chamber 25 and an air outlet 37 is formed on the air-discharging chamber 27. In the planar portion 32, a through hole 38 is formed between the air inlet 36 and the air outlet 37, at the position corresponding to the guide pipe 16.

As shown in FIG. 6, the air inlet 36 and the air inlet 37 have an elongated shape extending between the longer walls 12. On the upper edge of each of the air inlet 36 and the air outlet 37, a ring-shaped packing 39 is mounted. The packing 39 is formed on the planar portion 32 such that it protrudes toward the upper direction. The packing 39 water-tightly closes the air inlet 36 or the air inlet 37 when being contacted with a closing member described below. A packing 40 is mounted between the through hole 38 and the cylindrical portion 17 so as to prevent communication between the inner side of the container 2 and the space above the intermediate cover 31.

Above the intermediate cover 31, a closing member 41 is arranged. The closing member 41 is in the form of a plate which entirely cover the intermediate cover 31. On the lower surface of the closing member 41, a rod (movable member) 42 to be inserted into the guide pipe 16 is vertically formed. The rod 42 is inserted in the cylindrical portion 17 of the guide pipe 16 such that the rod 42 can reciprocally move in the axial direction thereof. The rod 42 has a length with which the distal portion 42a thereof is protruded from the bottom of the lower surface 11b of the bottom of the container 2 by a prescribed length when the closing member 41 contacts the intermediate cover 31.

On the periphery of the closing member 41, a small rib 43 is formed upright which slidably contacts the inner surface 33b of the peripheral wall 33. Thus, the closing member 41 can be moved in the vertical direction by virtue of the guidance of the rod 42 by the cylindrical portion 17 and by the guidance of the small rib 43 by the inner surface 33b.

The closing member 41 has an inlet-closing portion 44 which closes the air inlet 36 and an outlet-closing portion 45 which closes the air outlet 37 when the closing member 41 contacts the intermediate cover 31. The closing member 41 has an air-introducing opening 46 between the inlet-closing portion 44 and the rod 42, and an air-discharging opening 47 between the outlet-closing portion 45 and the rod 42.

As shown in FIG. 6, the air-introducing opening 46 has substantially the same shape and the same area as the air inlet 36 and the air-discharging opening 47 is in the form of a circle having substantially the same diameter with the diameter of the fan 60.

On the lower surface of the closing member 41, a lower partition plate 48 which separates the space between the closing member 41 and the intermediate cover 31 into an air-introducing side and an air-discharging side, is formed. The lower partition plate 48 extends in the direction perpendicular to the longer walls 12 and spans the opposite portions of the periphery wall 33. The lower partition plate 48 is vertically formed and is always inserted in a groove 31a formed in the intermediate cover 31 irrespective of the position of the closing member 41 which vertically moves.

On the upper surface of the closing member 41, a guide rod 49 is vertically formed, which is guided vertically by the outer cover 51. Above the intermediate cover 31, the outer cover 51 which continues to the upper end of the container 2 is mounted. The outer cover 51 has an outer wall 52 having a prescribed height and located on the fitting portion 15 and a ceiling portion 53 which closes the upper opening formed by the outer wall 52. Thus, between the outer cover 51 and the intermediate cover 31, an inner space is provided. The outer cover 51 is mounted on the container 2 by fitting a recessed fitting portion 52b formed at the lower position of the inner surface 52a of the outer wall 52 and the fitting portion 35 of the periphery wall 33 of the intermediate cover 31.

The outer wall 52 has an air-introducing hole 55 above the shorter wall 13A and an air-discharging hole 56 above the shorter wall 13B. In the air-introducing side, a bracket 57 is formed on the ceiling portion 53 and a humidity sensor which senses the humidity of the air is harbored therein. In the air-discharging side, an electric motor 59 is hung on the ceiling portion 53 such that the rotation axis is downwardly directed. A fan 60 is mounted on the rotation axis.

Between the bracket 57 and the electric motor 59, a guide shaft 61 for guiding the guide rod 49 is formed on the lower surface of the ceiling portion 53 of the outer cover 51. The guide shaft 61 has an outer diameter with which the guide shaft 61 can slidably move in the vertical direction sliding on the inner surface 49a of the guide rod 49. A spring 62 downwardly urging the rod 42 is enclosed in the guide shaft 61.

Figure 8:
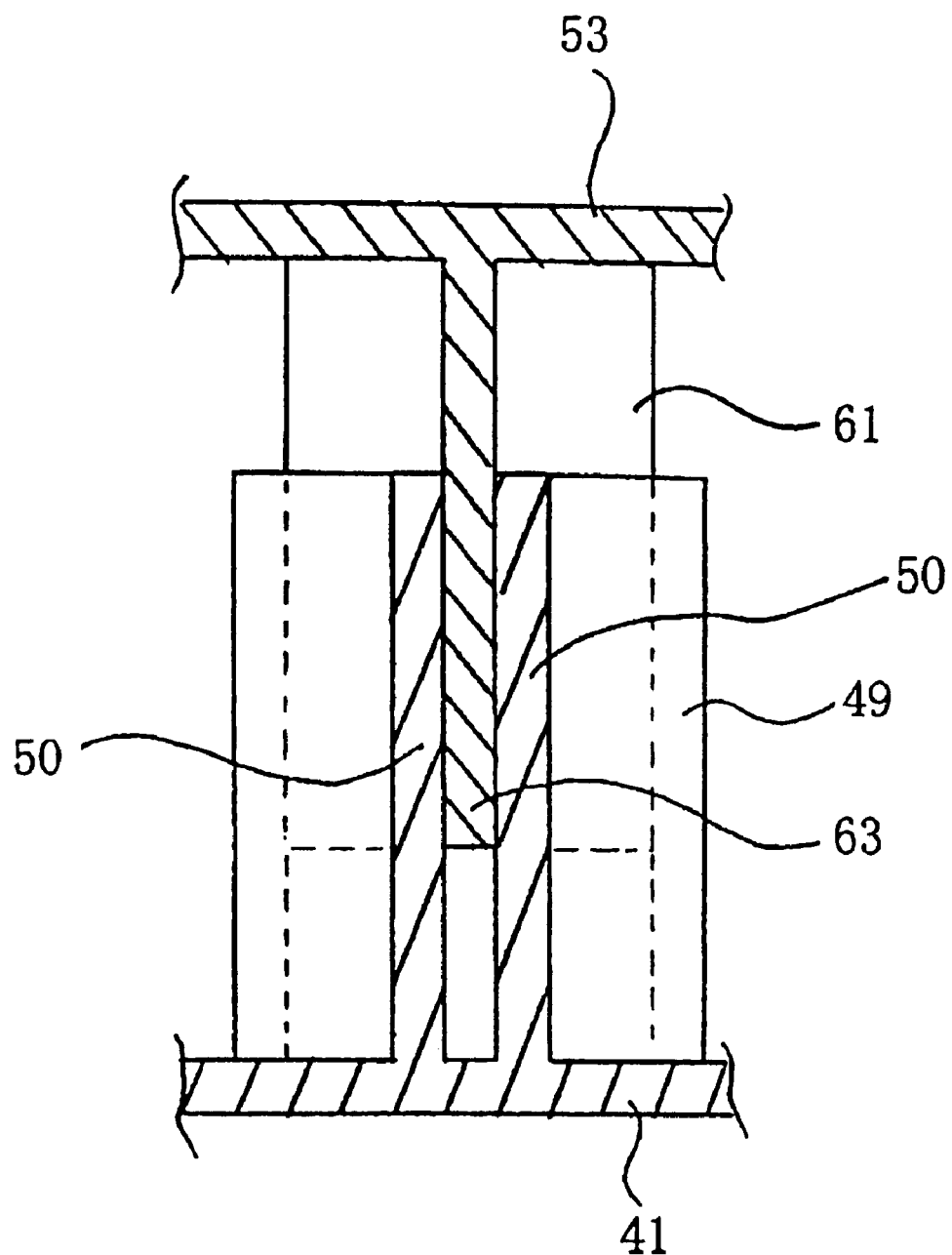
FIG. 8 is a schematic enlarged cross sectional view of the region in the vicinity of the guide shaft viewed from the longer wall.
Figure 9:
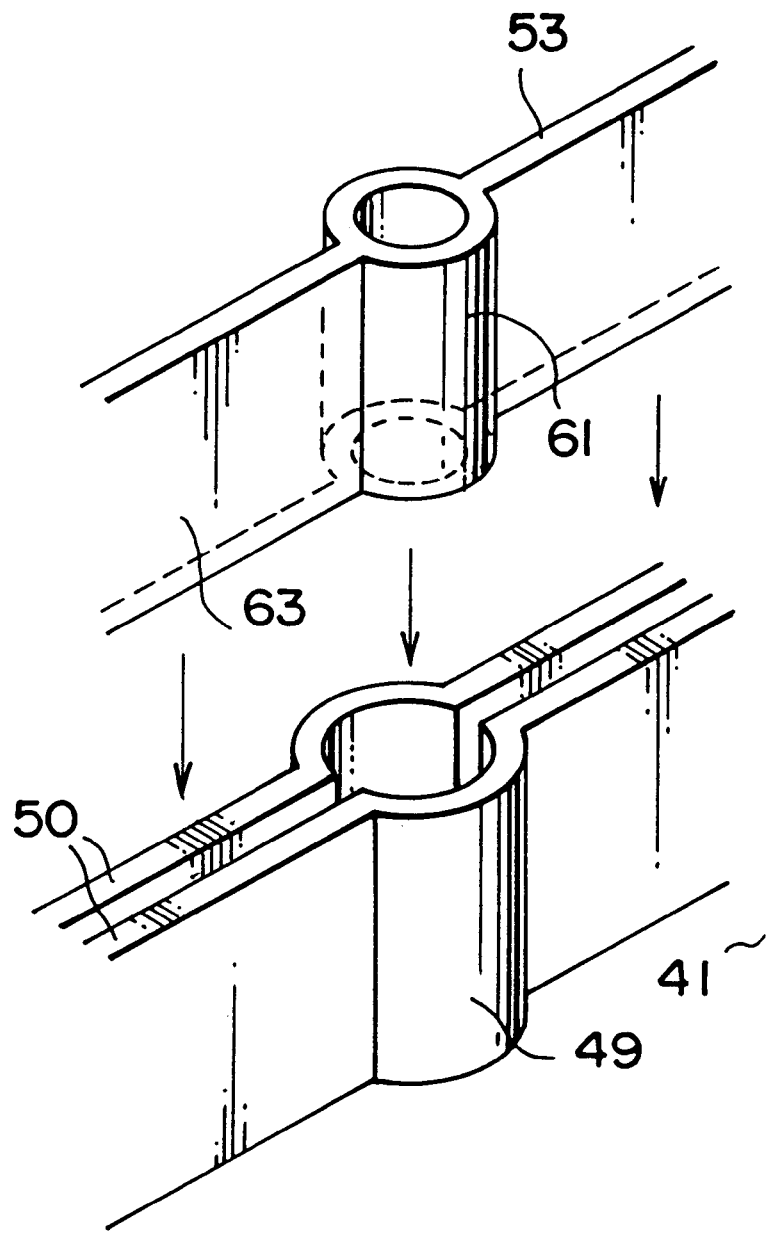
FIG. 9 is a schematic perspective view of the region shown in FIG. 8.

FIG. 8 is a schematic enlarged cross sectional view of the region in the vicinity of the guide shaft 61 viewed from the longer wall 12 and FIG. 9 is a schematic perspective view thereof. On the lower surface of the ceiling portion 53, an upper partition plate 63 is formed, which separates the inner space formed between the closing member 41 and the ceiling portion 53 into an air-introducing side and an air-discharging side. The upper partition plate 63 extends from the guide shaft 61 to the outer wall 52 in the direction perpendicular to the longer wall 12. The upper partition plate 63 is always slidably inserted in the gap between the two walls 50 formed on the closing member irrespective of the position of the closing member 41 which vertically moves. Thus, the inner space formed between the outer cover 51 and the intermediate cover 31 is separated into an air-introducing room 65 and an air-discharging room 66 by the lower partition plate 48 and the upper partition plate 63. The spring 62 (not shown in FIGS. 8 and 9) is held in the space in the guide shaft (see FIG. 9).

As shown in FIG. 5, a detachable cover 71 in the form of a reversed bowl is mounted on the outer cover 51. The detachable cover 71 harbors a rechargeable battery 72, a lamp 73 indicating the charging condition and a substrate 74 having a charging circuit. The detachable cover 71 is mounted on the outer cover 51 by inserting an attachment plug 75 downwardly projecting from the lower side of the substrate 74 into a plug-fitting hole 53c formed in the ceiling portion 53 of the outer cover 51.

The attachment plug 75 has the shape which can be inserted in a domestic plug socket (not shown) and the battery 72 is charged by inserting the attachment plug 75 into a domestic plug socket by virtue of the charging circuit formed on the substrate 74.

On the lower surface of the substrate 74, a contact 74a is formed separately from the attachment plug 75. When the detachable cover 71 is mounted on the outer cover 51, the contact 74a contacts connecting terminals 58a, 59a protruding on the ceiling portion 53 to a prescribed height so that the battery 72 is connected to the humidity sensor 58 and the electric motor 59.

In the detachable cover 71, a slit 78 is opened above the humidity sensor 58 mounted on the outer cover 51, so that air is introduced also from the upper side of the detachable cover 71.

In operation, by placing the dehumidification apparatus 1 on a plane in the normal position, the rod 42 downwardly protruding from the lower surface 11b of the bottom of the container 2 is pushed into the container 2 overcoming the urging force generated by the spring 62.

By this movement of the rod 42, the closing member 41 is moved in the direction apart from the intermediate cover 31, so that the air inlet 36 and the air outlet 37 are opened (the state shown in FIG. 5). If the humidity measured by the humidity sensor 58 is higher than the prescribed humidity selected by the user, power is supplied from the battery 72 to the electric motor 59, so that the fan 60 is rotated.

By rotation of the fan 60, the air in the inner space 30 is discharged from the air-discharging hole 56 and the ambient air is drawn from the air-introducing hole 55.

Thus, as shown by the thick arrows shown in FIG. 5, air is compulsively drawn from the air-introducing hole 55 and then discharged from the air-discharging hole 56 after passing through the air-introducing opening 46, the air inlet 36, the inner space 30, the air outlet 37 and the air-discharging opening 47 in the order mentioned.

During the passing through the inner space 30, the air contacts the dehumidification agent held in the holder 3 at the outer slant plates 22A and the inner slant plates 22B as well as at the vertical plates 21. Thus, the air can contact the dehumidification agent at wide area, so that the moisture in the air is well absorbed by the dehumidification agent. Therefore, the dehumidification ability of the dehumidification agent contained in the container is utilized maximally so that the dehumidification efficiency can be largely increased.

In cases where the dehumidification apparatus 1 is tumbled or the like, the bottom 11 of the container 2 becomes apart from the plane (not shown) on which the apparatus 1 was placed, and the rod 42 pushed into the container 2 protrudes from the lower surface 11b of the container 2 by virtue of the urging force given by the spring 62.

By this movement of the rod 42, the closing member 41 fixed to the rod 42 also moves together with the rod 42 so that the closing member 41 is pressed on the upper surface of the intermediate cover 31. By this, the air inlet 36 and the air outlet 37 are closed with the inlet-closing portion 44 and the outlet-closing portion 45, respectively, via the packing 39, so that the communication between the inner space 30 and the outside thereof is cut. Therefore, leakage of the deliquesced liquid accumulated in the inner space 30 to the outside is securely prevented.

Since the air inlet 36 and the air outlet 37 are formed in the intermediate cover 31, the deliquesced liquid may be accumulated up to a higher level in the container. Therefore, the inner space can be made small, so that the entire dehumidification apparatus 1 can be compacted.

The air inlet 36 and the air outlet 37 having large area can be formed at locations which are most apart from each other. Therefore, a large amount of air can be flown through the inner space 30 for a long distance, during which the air contacts the dehumidification agent at the under side or lateral side of the dehumidification agent. Therefore, a large amount of air can contact the dehumidification agent, so that the dehumidification ability of the dehumidification agent contained in the container is utilized maximally so that the dehumidification efficiency can be largely increased.

An experiment for showing the dehumidification ability of the dehumidification apparatus according to the present invention was carried out in comparison with a conventional dehumidification apparatus. The dehumidification apparatus according to the present invention was that shown in FIGS. 5 to 9, and the conventional dehumidification apparatus was that shown in FIG. 12. The containers of the both apparatuses had an inner volume of 0.1089 $m^3$, and contained 170 g of calcium chloride granules as the dehumidification agent, respectively. The electric power supplied to the apparatus of the present invention was 5.9 mW·h and that supplied to the conventional apparatus was 7.8 mW·h. The results are shown in FIGS. 10 and 11.

Figure 10:
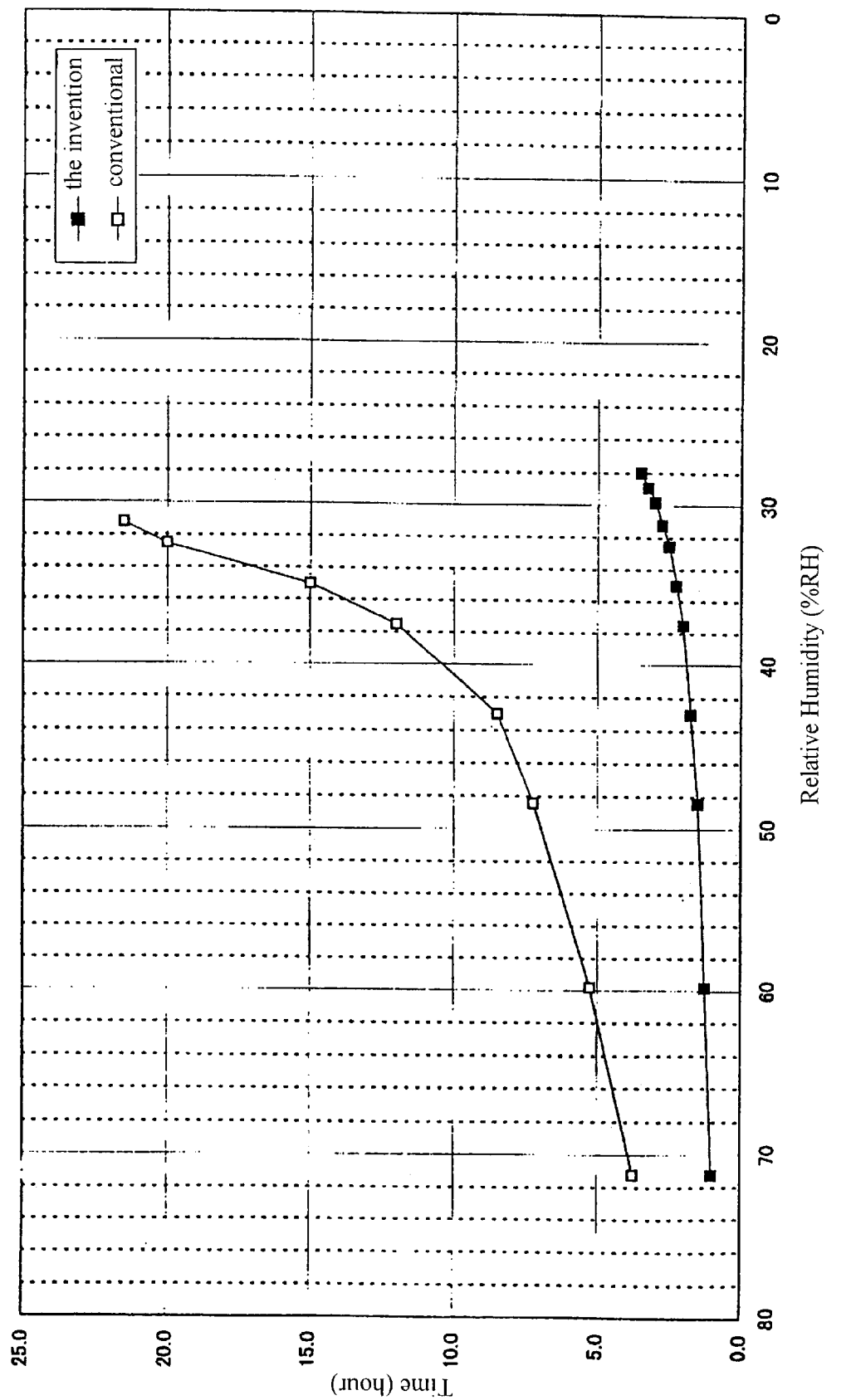
FIG. 10 shows the relationship between the final relative humidity (%) and the time (hour) required to attain the final relative humidity when the apparatuses were operated in a closed box having a relative humidity of 80%.

FIG. 10 shows the relationship between the final relative humidity (%) and the time (hour) required to attain the final relative humidity when the apparatuses were operated in a closed box having a relative humidity of 80%.

As shown in FIG. 10, by using the conventional apparatus, it took more than hours to decrease the relative humidity to 40%, while it took only about 2 hours by using the apparatus according to the present invention.

Figure 11:
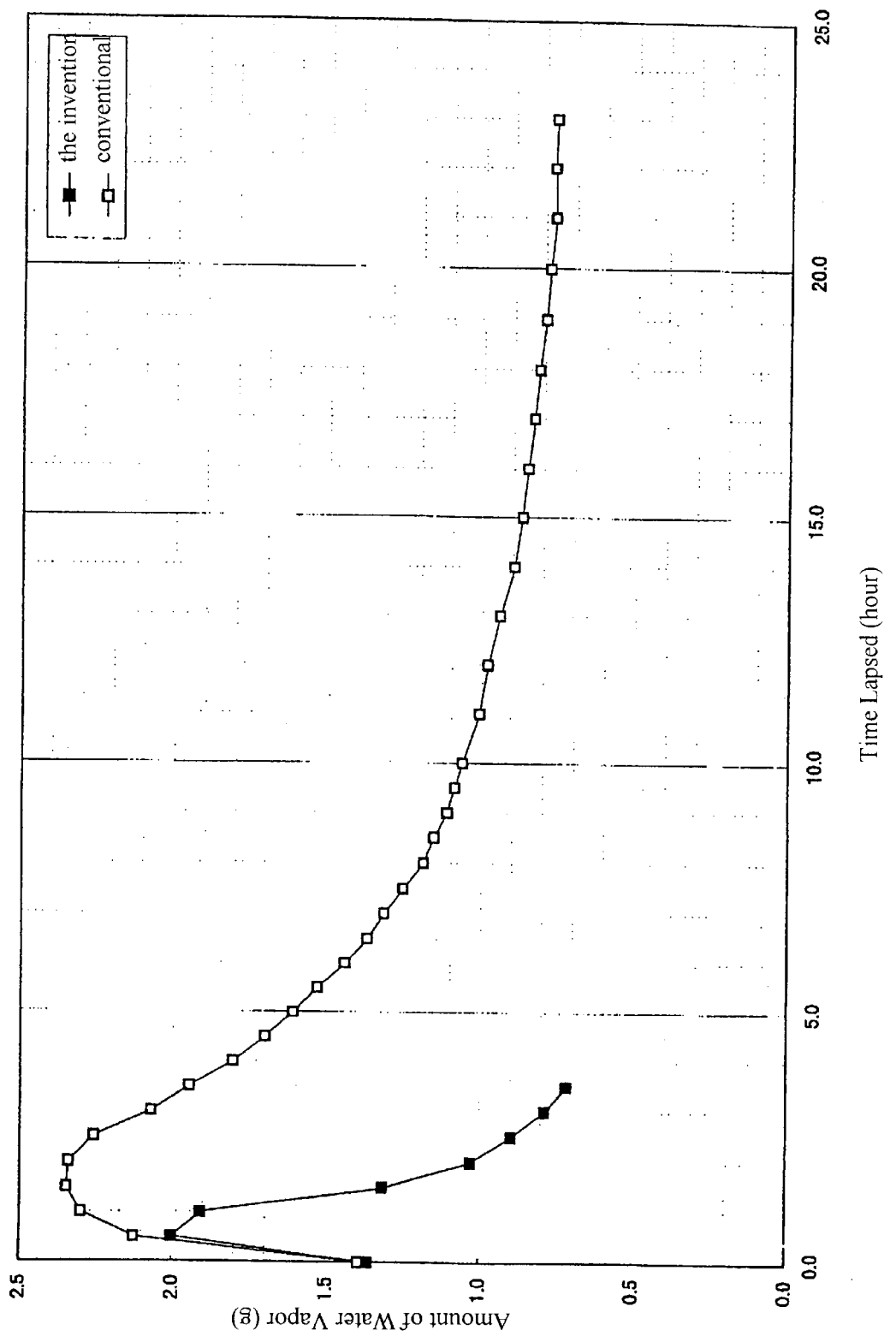
FIG. 11 shows the relationship between the time (hour) in which the apparatuses were operated and the amount of the water vapor (g) in the closed box.
Figure 12:
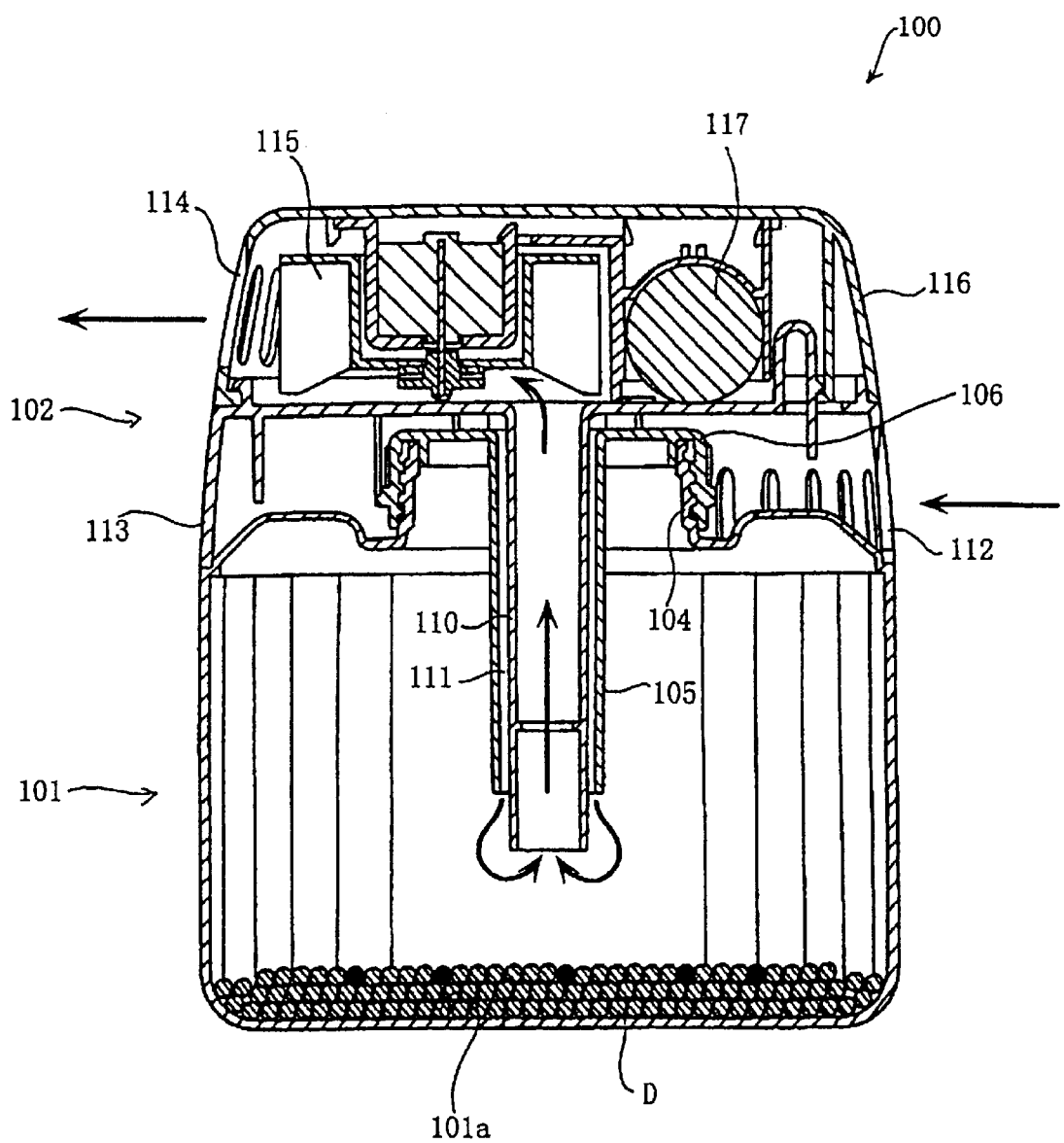
FIG. 12 is a schematic cross sectional view of a conventional dehumidification apparatus.

FIG. 11 shows the relationship between the time (hour) in which the apparatuses were operated and the amount of the water vapor (g) in the closed box.

As shown in FIG. 11, the amount of the water vapor was much more rapidly decreased by using the apparatus according to the present invention than by using the conventional apparatus.

Although the present invention was described by way of preferred embodiments thereof, the present invention is not restricted to the specific embodiments mentioned above and various modifications may be made within the scope of the present invention without departing from the spirit of the present invention. For example, although the movable member is a rod in the embodiments described above, any movable member which is pushed into the container when the apparatus is correctly placed with its bottom down and the air inlet and the air outlet are closed by this movement of the movable member may be employed. For example, a lever whose one end is axially attached to the bottom of the container and whose other end can be protruded from the bottom by rotation of the lever may be provided, and the air inlet and the air outlet may be closed and opened by the rotation of the lever.

We claim:

1. A dehumidification apparatus comprising:
   a container containing a deliquescent dehumidification agent, which container has at least one air inlet and at least one air outlet, and has an upper plate covering the container;
   at least one closing member which can close said air inlet and said air outlet;
   at least one movable member having each distal end, which member can move in the vertical direction, which member is attached to said closing member, and which member is urged downwardly such that when the dehumidification apparatus is not placed with its bottom down, said distal end of said movable member protrudes from said bottom of said apparatus so that said closing member closes said air inlet and said air outlet, and when the dehumidification apparatus is placed on a plane with its bottom down, said distal end of said movable member is made flush with said bottom overcoming the downward urging force by virtue of weight of the apparatus so that said air inlet and said air outlet are open; and
   a fan driven by a motor, which introduces air into said container from said air inlet and discharges air from said container through said air outlet so that the air passes through said container.

2. The dehumidification apparatus according to claim 1, wherein said air inlet and said air outlet are formed in said upper plate of said container.

3. The dehumidification apparatus according to claim 2, wherein said closing member is at least one plate and said movable member is at least one vertically extending rod whose proximal end is attached to said plate constituting said closing member.

4. The dehumidification apparatus according to claim 3, wherein said container has at least one vertically extending through hole in which said movable member is inserted.

5. The dehumidification apparatus according to claim 4, comprising at least one spring whose one end is fixed and whose another end is attached to said movable member, thereby said spring downwardly urges said movable member.

6. The dehumidification apparatus according to claim 5, wherein said spring is inserted in said through hole and said movable member is inserted in said spring.

7. The dehumidification apparatus according to claim 6, wherein said fixed end of said spring is fixed to a supporting member which is formed on at least a portion of periphery of said through hole.

8. The dehumidification apparatus according to claim 3, wherein said closing member has protrusions which correspond to said air inlet and said air outlet, respectively, said protrusions being inserted into said air inlet and said outlet, respectively, when said closing member closes said air inlet and said air outlet.

9. The dehumidification apparatus according to claim 2, comprising a first closing member that can close said at least one air inlet and a second closing member that can close said at least one air outlet, and a first movable member whose proximal end is attached to said first closing member, and a second movable member whose proximal end is attached to said second closing member.

10. The dehumidification apparatus according to claim 9, wherein said first closing member is a plate and said first movable member is a vertically extending rod whose proximal end is attached to said plate constituting said first closing member, and said second closing member is a plate and said second movable member is a vertically extending rod whose proximal end is attached to said plate constituting said second closing member.

11. The dehumidification apparatus according to claim 10, wherein said container has a first vertically extending through hole in which said first movable member is inserted and a second vertically extending through hole in which said second movable member is inserted.

12. The dehumidification apparatus according to claim 11, comprising a first spring whose one end is fixed and whose another end is attached to said first movable member, and a second spring whose one end is fixed and whose another end is attached to said second movable member, thereby said first spring downwardly urges said first movable member and said second spring downwardly urges said second movable member.

13. The dehumidification apparatus according to claim 12, wherein said first spring is inserted in said first through hole and said first movable member is inserted in said first spring, and said second spring is inserted in said second through hole and said second movable member is inserted in said second spring.

14. The dehumidification apparatus according to claim 13, wherein said fixed end of said first spring is fixed to a first supporting member which is formed on at least a portion of periphery of said first through hole, and said fixed end of said second spring is fixed to a second supporting member which is formed on at least a portion of periphery of said second through hole.

15. The dehumidification apparatus according to claim 10, wherein said first closing member has at least one protrusion which corresponds to said at least one air inlet, and said second closing member has at least one protrusion which corresponds to said at least one air outlet, said protrusions being inserted into said air inlet and said outlet, respectively, when said first and second closing members close said air inlet and said air outlet.

16. The dehumidification apparatus according to claim 2, further comprising a vessel on the upper plate of said container communicating with inner side of said container through said air inlet and said air outlet, which vessel has at least one air-introduction hole and at least one air-discharging hole, and has an upper plate covering the vessel.

17. The dehumidification apparatus according to claim 16, wherein said vessel is separated into first and second chambers, said first chamber having said air-introduction hole and in which said air inlet is open, said second chamber having said air-discharging hole and in which said air outlet is open.

18. The dehumidification apparatus according to claim 16, wherein said fan is harbored in said vessel.

19. The dehumidification apparatus according to claim 16, wherein the upper plate of said vessel is constituted by a separable cover and said fan is hung on said cover.

20. The dehumidification apparatus according to claim 16, further comprising a humidity sensor in said vessel, which sensor is electrically connected to said motor which drives said fan.

* * * * *